April 8, 1952   W. FREY ET AL   2,592,021
METHOD FOR PURIFYING NORMALLY LIQUID CHLORIDES
OF METALS OF GROUP 4 OF THE PERIODIC SYSTEM
Filed July 14, 1948
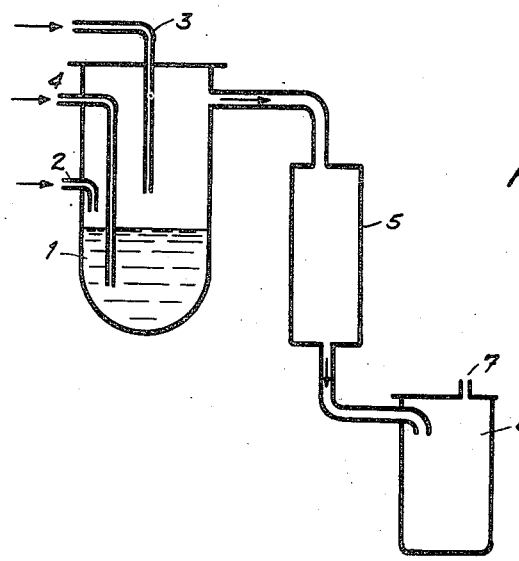
Fig. 1
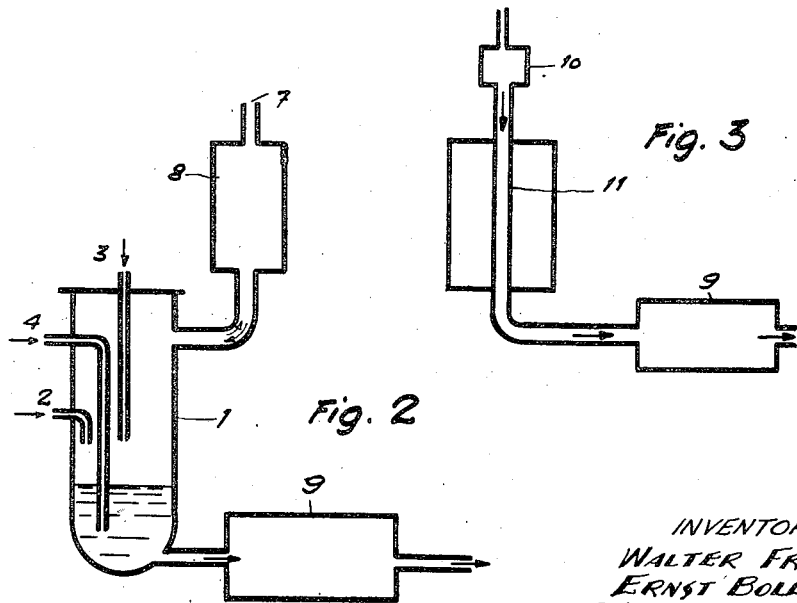
Fig. 2
Fig. 3
INVENTORS
WALTER FREY
ERNST BOLLER
BY
Hammond & Littell
ATTORNEYS Patented Apr. 8, 1952

2,592,021

UNITED STATES PATENT OFFICE 2,592,021

METHOD FOR PURIFYING NORMALLY LIQUID CHLORIDES OF METALS OF GROUP 4 OF THE PERIODIC SYSTEM

Walter Frey, Basel, and Ernst Boller, Pratteln, Switzerland, assignors to Saeurefabrik Schweizerhall, Schwiezerhalle, Switzerland, a corporation of Switzerland Application July 14, 1948, Serial No. 38,734
In Switzerland July 26, 1947

12 Claims. (Cl. 23—87)

This invention relates to a method of purifying liquid chlorides of metals of the 4th group of the periodic system. As is well known, the 4th group of the periodic system comprises the elements C, Si, Ti, Zr, Hf, Th, Ge, Sn and Pb.

These metal chlorides are obtained after known methods by direct chlorination of the respective metals, alloys, oxides or oxide ores and owing to the impurities contained in the initial products, they are always impurified by other volatile metal chlorides. The metal chlorides which are solid at normal temperature, such as trichloride of iron, are not soluble or only difficultly soluble in the liquid chlorides. On the other hand, the liquid metal chlorides, such as tetrachloride of vanadium, oxychloride of vanadium and chromylchloride, are completely soluble in the four-valent liquid chlorides, causing the undesirable colouring of the four-valent chlorides which in their pure condition are colourless. Thus, for instance, by chlorinating rutile which always contains up to 1 percent of vanadium oxide and up to 0.5 percent of chromium oxide, a titanium chloride is obtained which contains 0.7 to 0.8 percent vanadium oxychloride and vanadium tetrachloride and up to 0.1 percent chromium oxychloride and, therefore, is of a dark yellow colour. When chlorinating kieselguhr, there is obtained a bright yellow silicon tetrachloride by small quantities (less than 0.1 percent) of vanadium oxychloride. The present process primarily relates to the purification of the liquid four-valent chlorides to eliminate these liquid coloured chlorides.

Simple distillation or even a carefully executed fractional distillation of the coloured metal chlorides would not produce the desired result, since the boiling points of the coloured and of the colourless chlorides are too close together. Now, it is known to effect the purification by absorption of the coloured chlorides on active carbon, silicagel etc. in a liquid or vaporized condition, or to convert the coloured, volatile chlorides at a higher temperature, by means of hydrogen, into non-volatile chlorides, and thus to separate them from the colourless chlorides. Also it has been suggested to treat the raw chlorides in a liquid state with substances such as sulphur, soap, or with metal powders in the presence of alkalies, whereby the coloured chlorides are converted by reactions which partly are unknown, into non-volatile compounds, so that a chloride which is free from foreign metal chlorides may be distilled off.

Now, it has been found that the purification of the metal chlorides of the fourth group from the coloured metal chlorides can be effected more easily and cheaply in such a way that the chlorides are treated at a higher temperature with organic compounds, preferably used in small quantities, which have no metal attached to the molecule, under such conditions that these organic compounds are carbonized by the chlorides, whereupon the metal chloride freed from the colored chlorides is separated from the eliminated product of carbonization containing the impurities.

As a purifying agent, there may be used, e. g. liquid or vaporous or gaseous hydrocarbons, oils and fats, alcohols, ketones, organic acids, amines and the like. Especially hydrocarbons with at least 2 C atoms and organic compounds containing besides hydrogen at least one activating substituent such as a hydroxyl-, oxy-, keto-, amino- or/and carboxyl group or mixtures containing such substances proved to be suitable.

The organic substances show a different activity as regards purification, depending on their constitution. Therefore, the conditions of the treatment, especially the temperature and pressure conditions, must be adapted to the purifying agent in question. Organic, animal or vegetable fats and oils, especially those with unsaturated combinations, moreover unsaturated hydrocarbons with at least 4 C atoms, also for instance in the form of cracking gases, unsaturated mineral oils, crude oil and benzene are particularly capable of reaction. With these substances in general a reaction temperature of 100–200° centigrade is sufficient. The vegetable and animal fats and oils are referred to hereinafter as fatty oil substances.

Other organic substances, such as for example low molecular, saturated hydrocarbons, aromatic hydrocarbons, alcohols etc. often-times are less capable of reaction and require a higher reaction temperature of 200 to 500° C. When using such purifying agents, therefore, it may be necessary to carry out the purification process under pressure, by heating the mixture or the solution, consisting of metal chloride and purifying agents, to the reaction temperature in autoclaves. The purification under pressure is advantageous especially also where silicon chloride is to be purified, for its boiling point is so low that the treatment at normal pressure would take a long time even when using very active purifying agents. By applying higher temperature such as attainable with higher pressure the duration of the treatment can be considerably shortened. The purification by means of gaseous organic substances can be carried out in such a way that the gaseous purifying agent is passed through the metal chloride which is preferably at boiling temperature, at normal or increased pressure.

The manner of action of my novel purifying process probably is due to the fact that the finely dispersed carbon resulting from the carbonisation process has a very high absorption capacity especially for the colored liquid chlorides.

Our novel method offers the advantage that very cheap purifying agents, such as petrol, crude oil, benzene, liquid paraffin, cracking gases, animal and vegetable fats and oils etc. can be used. Also it is easy to be carried out technically, since the elaborate stirring operation required when using solid purifying agents, such as soap, sulfur and metal powder, can be avoided by using as purifying agents either liquid substances which are partly or wholly soluble in the metal chlorides, such as petrol, benzene and certain mineral oils, or by operating with gaseous purifying agents. The agitation attainable by heating, especially by boiling of the metal chloride, or by introducing a gas, is sufficient for a satisfactory dispersion of the purifying agent in the metal chloride.

Moreover, the purifying operation may be carried out in the form of a continuous process by evaporating the metal chloride to be purified from a still, feeding continuously besides the metal chloride a small quantity of a liquid or gaseous purifying agent, removing continuously or in batches a part, or the whole contents of the still, separating the eliminated, carbonized residue from the liquid, by filtration, and advantageously returning the latter to the still. It will be seen from the examples hereinafter set forth that the contents of colored chlorides can be removed practically completely with minimum losses in colorless metal chloride. The metal chlorides thus purified can be used directly as initial materials for the production of absolutely white pigment colors, such as, for instance, titanium oxide.

A wide variety of different apparatuses can be used for carrying out our novel method, the selection of the most suitable apparatus depending on the conditions of the treatment and the separating methods. When carrying out the method in batches, the apparatus may consist of a still with cooler and adapter or filter, or, in the case of working under pressure, of a stationary or rotary autoclave, combined with a filter or a still pipe with cooler or adapter. For continuous operation the apparatuses shown schematically in the accompanying drawings may be used, in which:

Fig. 1 is a diagrammatic sectional view of a first embodiment;

Fig. 2 is a similar view, showing a second embodiment, and

Fig. 3 is a diagrammatic sectional view showing a third embodiment.

Referring now to the drawings in greater detail, and first to Fig. 1 it will be seen that the purifying apparatus consists of a still 1 with feed duct 2 for the chloride to be purified, a feed pipe 3 for the liquid purifying agent, a feed pipe 4 for a gaseous purifying agent, a cooler 5 for condensation of the pure chloride and a recipient vessel 6 provided with a vent pipe 7.

The apparatus according to Fig. 2 consists of a still 1, a return cooler 8, provided with a vent pipe 7, and a filter 9 for filtration of the treated liquid chloride. The devices according to Figs. 1 and 2 may be operated at normal or increased pressure.

The device shown in Fig. 3 consists of a pump 10 by which the mixture, advantageously the solution, of the chloride and the purifying agent is forced into the pressure pipe 11 which is heated from outside. Connected to the pressure pipe is a filter 9 for removing the carbonisation product. Particularly adapted for the filtering operation are ceramic filters, e. g. porous filter plates or filter presses and suction filters with filter cloth of glass or quartz thread.

Some examples of our novel process will now be described.

*Example 1.*—200 grams of titanium chloride, impurified by 2 grams of vanadium chloride, are mixed with 2 grams of linseed oil, boiled for half an hour, and then the titanium chloride is distilled off. A product as clear as water will be obtained with less than 0.01 percent by weight of vanadium. From the same vessel another 7 exactly similar charges with the same admixture of linseed oil are heated and distilled, with the result that a distillate free from vanadium will always be obtained. After the last distillation the carbon-like residue of all the 8 distillations will be removed from the flask and examined; they will contain all the vanadium and 10 grams of titanium chloride so that the loss in titanium chloride is only 0.7 percent.

*Example 2.*—500 grams of tin tetachloride, impurified by 2.5 grams of vanadium chloride, are boiled with 5 grams of diesel oil for a period of 2 hours and then distilled. The distillate will contain less than 0.01 percent of vanadium.

*Example 3.*—100 grams of silicon chloride, impurified with 0.1 percent of vanadium chloride, are boiled for one hour with 0.1 gram of castor oil under pressure at 150° C. and distilled. The condensation product will contain less than 0.01 percent vanadium.

*Example 4.*—200 grams of titanium chloride impurified with 2 grams of vanadium chloride are boiled for a period of 2 hours with 2 grams of crude petroleum and distilled. The distillate will contain about 0.05 percent of vanadium. To the carbonized residue a second charge of an equal amount is added, also impurified with 2 grams of vanadium chloride, with another addition of 2 grams of crude petroleum, and distilled after 2 hours of boiling, with the result that the distillate will contain less than 0.01 percent of vanadium.

*Example 5.*—200 grams of titanium chloride impurified with 1.5 grams of vanadium chloride are boiled with 2 grams of pulverulent anthracene and then distilled. No vanadium will be found left in the condensed titanium chloride.

*Example 6.*—200 grams of titanium chloride impurified with 2.5 grams of vanadium chloride are boiled for 2 hours with watchmaker's oil, the residue is filtered off after the boiling and a clear titanium chloride, but dark-colored by organic decomposition products, with less than 0.01 percent of vanadium, will be obtained.

*Example 7.*—A continuously operating distilling apparatus with a still capacity of 600 cubic centimeters is fed with titanium chloride impurified with 1 percent vanadium chloride and 0.3 percent of chromyl chloride, and with cylinder oil, in a ratio of 200:1 at a speed of 900 grams titanium chloride per hour, obtaining a titanium chloride distillate with less than 0.01 percent vanadium and 0.005 percent chromium. After 10 hours of operation the contents of the still is filtered, returning the filtrate to the still which then is ready again for a new operating period of 10 hours.

*Example 8.*—A weak current of amylene ($C_5H_{10}$) is passed through boiling titanium chloride containing 1 percent vanadium chloride, causing the precipitation of a solid carbonisation product. After distilling off from the residue the chloride contains less than 0.01 percent vanadium chloride.

*Example 9.*—Stannic chloride, impurified with 0.2 percent of vanadium chloride, is saturated with propylene in an autoclave at a pressure of 9 atmospheres, then heated to 350° C. and distilled off. The condensate is vanadium-free.

*Example 10.*—5 grams of pentane are dissolved in 200 grams of titanium chloride which is impurified with 2 grams of vanadium chloride, and the mixture is passed continuously in a liquid state through a pressure pipe at 300° C. and 30 atmospheres. The still hot reaction mixture is filtered through a ceramic filter. The filtered titanium chloride contains less than 0.01 percent vanadium.

*Example 11.*—200 grams of silicon chloride, impurified with 0.1 percent of vanadium chloride, are heated with 5 grams of benzol for one hour to 300° C. in an autoclave, reaching a pressure of 90 atmospheres. The silicon chloride is distilled off and contains less than 0.01 percent vanadium.

*Example 12.*—200 grams of stannic chloride, impurified with 0.5 percent of vanadium chloride, are heated with 10 grams of benzene for one hour to 300° C. at a pressure of 30 atmospheres in a rotary autoclave and then distilled off from the autoclave. The distillate is vanadium-free.

A number of purifying agents which may be used in connection with our novel process, and the most favorable temperatures for treatment therewith will be specified hereinafter.

GROUP I

*Purifying agents with an optimum purifying temperature of 100 to 200° C.*

Dipentene, amylene, allylalcohol, acetone, diisobutylketone, tertiary amylalcohol, anthracene, brenzcatechine, α-naphthol, β-naphthylamine, cyclohexanone, cyclohexanol, furfural, linseed oil, castor oil, salad oil, cylinder oil, engine oil, watchmaker's oil, anthracene oil, crude oil, petrol, benzene.

GROUP II

*Purifying agents with optimum purifying temperature from 200 to 300° C.*

Liquid paraffin, heptylalcohol, cetylalcohol, diethylamine naphthaline, phenylacetic acid, o-aminophenol.

GROUP III

*Purifying agents with optimum purifying temperature from 300 to 500° C.*

Ethylene, acetylene, propylene, propane, pentane, benzol, toluol, urea, dicyandiamid, methyl alcohol, glycerine, ethyl alcohol.

While we have described what we believe to be a preferred form of carrying out our novel process, we would have it understood that we do not limit ourselves to the precise details set forth, but consider ourselves at liberty to make such changes and alterations as fairly fall within the spirit and scope of the invention.

Having thus described our invention, what we claim as new and desire to secure by Letters Patent is:

1. A process for removing coloring impurities from an impure normally liquid chloride of a metal of group 4 of the periodic system which comprises intermixing said chloride and a small proportion of an organic compound selected from the group consisting of hydrocarbons and compounds of carbon, hydrogen and at least one substituent from the group consisting of hydroxy, oxy, keto, amino and carboxyl radicals, heating said organic compound in a liquid body of said chloride at a temperature between 100° and 500° C. at which said compound carbonizes therein until a finely dispersed carbonization product is formed and until said impurities are taken up by said carbonization product, and separating purified metal chloride from said carbonization product holding said impurities.

2. A process for removing coloring impurities from an impure normally liquid chloride of a metal of group 4 of the periodic system which comprises intermixing said chloride and a small proportion of an organic compound selected from the group consisting of hydrocarbons and compounds of carbon, hydrogen and at least one substituent from the group consisting of hydroxy, oxy, keto, amino and carboxyl radicals, heating said organic compound in a liquid body of said chloride under superatmospheric pressure and at a temperature between 100° and 500° C. at which said compound carbonizes therein until a finely dispersed carbonization product is formed and until said impurities are taken up by said carbonization product, and separating purified metal chloride from said carbonization product holding said impurities.

3. A process for removing coloring impurities from an impure normally liquid chloride of a metal of group 4 of the periodic system which comprises intermixing said chloride and a small proportion of an organic compound selected from the group consisting of unsaturated fats and oils and unsaturated hydrocarbons containing at least 4 carbon atoms, heating said organic compound in a liquid body of said chloride at a temperature between 100° to 200° C. at which said compound carbonizes therein until a finely dispersed carbonization product is formed and until said impurities are taken up by said carbonization product, and separating purified metal chloride from said carbonization product holding said impurities.

4. A process for removing coloring impurities from an impure normally liquid chloride of a metal of group 4 of the periodic system which comprises intermixing said chloride and a small proportion of an organic compound selected from the group consisting of saturated hydrocarbons, aromatic hydrocarbons, alcohols, ketones, organic acids and amines, heating said organic compound in a liquid body of said chloride at a temperature between 200° and 500° C. at which said compound carbonizes therein until a finely dispersed carbonization product is formed and until said impurities are taken up by said carbonization product, and separating purified metal chloride from said carbonization product holding said impurities.

5. A process for removing coloring impurities from an impure normally liquid chloride of a metal of group 4 of the periodic system which comprises intermixing said chloride and a small proportion of an organic compound selected from the group consisting of saturated hydrocarbons, aromatic hydrocarbons, alcohols, ketones, organic acids and amines, heating said organic compound in a liquid body of said chloride under superatmospheric pressure and at a temperature between 200° and 500° C. at which said compound carbonizes therein until a finely dispersed carbonization product is formed and until said impurities are taken up by said carbonization product, and separating purified metal chloride from said carbonization product holding said impurities.

6. A process for removing coloring impurities from an impure normally liquid chloride of a metal of group 4 of the periodic system which comprises introducing into a liquid body of said chloride a small proportion of a compound selected from the group consisting of gaseous hydrocarbons and gaseous compounds of carbon, hydrogen and at least one substituent from the group consisting of hydroxy, oxy, keto, amino and carboxyl radicals, heating said organic compound in said liquid body at boiling temperatures between 100° and 500° C. at which said compound carbonizes therein and a finely dispersed carbonization product is formed and until said impurities are taken up by said carbonization product, and separating purified metal chloride from said carbonization product holding said impurities.

7. A process for removing coloring impurities from an impure normally liquid chloride of a metal of group 4 of the periodic system which comprises dissolving in a liquid body of said chloride a small proportion of a liquid organic compound soluble therein selected from the group consisting of liquid hydrocarbons soluble therein and a likewise soluble compound of carbon, hydrogen and at least one substituent of the group consisting of hydroxy, oxy, keto, amino and carboxyl radicals, heating said organic compound dissolved in said liquid body at a temperature between 100° and 500° C. at which said compound carbonizes therein until a finely dispersed carbonization product is formed and until said impurities are taken up by said carbonization product, and separating purified metal chloride from said carbonization product holding said impurities.

8. A continuous process for removing coloring impurities from an impure liquid chloride of a metal of group 4 of the periodic system, which comprises continually flowing into a reaction zone said chloride and a relatively small amount of an organic compound from the group consisting of hydrocarbons and compounds of carbon, hydrogen and at least one substituent from the group consisting of hydroxy, oxy, keto, amino and carboxyl radicals, continuously heating said organic compound in a liquid body of said chloride at a temperature between 100° and 500° C. at which said compound carbonizes therein until a finely dispersed carbonization product is formed and until said impurities are taken up by said carbonization product, continually removing from said zone said carbonization product holding said impurities and continually removing from said zone purified chloride of said metal.

9. A process as described in claim 8, the inflow to said zone being a stream of a solution of said compound in the impure liquid chloride.

10. A continuous process for removing coloring impurities from an impure liquid chloride of a metal of group 4 of the periodic system, which comprises continually flowing into a reaction zone said chloride and a relatively small amount of an organic compound from the group consisting of hydrocarbons and compounds of carbon, hydrogen and at least one substituent from the group consisting of hydroxy, oxy, keto, amino and carboxyl radicals, continuously heating said organic compound in a liquid body of said chloride in said zone at a temperature between 100° and 500° C. at which said compound carbonizes therein until a finely dispersed carbonization product is formed and until said impurities are taken up by said carbonization product, continuously distilling purified chloride of said metal from said zone, continually withdrawing part of the liquid therefrom, and separating purified metal chloride from the carbonization product in the withdrawn liquid holding the impurities.

11. A process for removing coloring impurities from liquid titanium tetrachloride which comprises intermixing said chloride and a small proportion of an organic compound selected from the group consisting of hydrocarbons and compounds of carbon, hydrogen and at least one substituent from the group consisting of hydroxy, oxy, keto, amino and carboxyl radicals, heating said organic compound in a liquid body of the titanium tetrachloride at a temperature between 100° and 500° C. at which said compound carbonizes therein until a finely dispersed carbonization product is formed and until said impurities are taken up by said carbonization product, and separating purified metal chloride from said carbonization product holding said impurities.

12. A process for removing coloring impurities from impure liquid titanium tetrachloride which comprises continually flowing into a reaction zone said titanium tetrachloride and a small proportion of an organic compound selected from the group consisting of hydrocarbons and compounds of carbon, hydrogen and at least one substituent from the group consisting of hydroxy, oxy, keto, amino and carboxyl radicals, continually heating said organic compound in a liquid body of the titanium tetrachloride at a temperature between 100° and 500° C. at which said compound carbonizes therein until a finely dispersed carbonization product is formed and until said impurities are taken up by said carbonization product, continually removing from said zone said carbonization product holding said impurities, and continually removing from said zone purified chloride of said metal.

WALTER FREY.
ERNST BOLLER.

REFERENCES CITED

The following references are of record in the file of this patent:

UNITED STATES PATENTS

| Number | Name | Date |
|---|---|---|
| 2,289,327 | Pechukas | July 7, 1942 |
| 2,289,328 | Pechukas | July 7, 1942 |
| 2,370,525 | De Witt | Feb. 27, 1945 |
| 2,396,458 | Cole et al. | Mar. 12, 1946 |
| 2,412,349 | Meyers | Dec. 10, 1946 |
| 2,415,958 | Meyers | Feb. 18, 1947 |
| 2,416,191 | Meister | Feb. 18, 1947 |

(Other references on following page)

OTHER REFERENCES

Mellor—"Modern Inorganic Chemistry," pp. 862–865. New Impression of Eighth Ed., Jan. 1935. Longmans, Green & Co., N. Y.

"The Science of Petroleum," vol. 2, pp. 1033–1040. Oxford University Press, N. Y.

"Chemical Technology and Analysis of Oils, Fats and Waxes," by Dr. J. Lewkowitch, vol. 1, pp. 219, 220. 1909 Ed. MacMillan and Co., Ltd., London.

Hackh's Chem. Dictionary, 3rd Ed., p. 607. The Blakiston Co., Phila.

"Chemical Constituents of Petroleum" by A. N. Sachanen, pp. 364–370, 416. 1945 Ed. Reinhold Pub. Co., N. Y.

"Outline of Organic Chemistry," by Degering, Nelson, Harrod, page 124. 1937 Ed. Barnes & Noble, Inc., N. Y.

"Chemical Refining of Petroleum" by Kalichevsky and Stagner, pp. 42, 43. 1933 Ed. The Chem. Catalog Co., Inc., N. Y.